United States Patent [19]

Gardner

[11] 4,386,945
[45] Jun. 7, 1983

[54] PROCESS AND COMPOUND BED MEANS FOR EVOLVING A FIRST COMPONENT ENRICHED GAS

[75] Inventor: Paul J. Gardner, Davenport, Iowa

[73] Assignee: Litton Systems, Inc., Davenport, Iowa

[21] Appl. No.: 344,894

[22] Filed: Feb. 1, 1982

[51] Int. Cl.³ .......................................... B01D 53/04
[52] U.S. Cl. ........................................ 55/26; 55/58;
55/62; 55/68; 55/180; 55/389
[58] Field of Search ............. 55/25, 26, 58, 62, 68,
55/75, 161-163, 179, 180, 387, 389

[56] References Cited

U.S. PATENT DOCUMENTS

| | | | |
|---|---|---|---|
| 2,739,664 | 3/1956 | Parks | 55/33 |
| 2,918,140 | 12/1959 | Brooks | 55/58 |
| 3,102,013 | 8/1963 | Skarstrom | 55/31 |
| 3,149,934 | 9/1964 | Martin | 55/58 |
| 3,150,942 | 9/1964 | Vasan | 55/31 |
| 3,155,468 | 11/1964 | de Montgareuil et al. | 55/58 X |
| 3,796,022 | 3/1974 | Simonet et al. | 55/25 |
| 3,880,616 | 4/1975 | Myers et al. | 55/62 |
| 3,923,477 | 12/1975 | Armond et al. | 55/25 |
| 4,011,065 | 3/1977 | Munzner et al. | 55/25 |

*Primary Examiner*—Robert H. Spitzer
*Attorney, Agent, or Firm*—Brian L. Ribando

[57] ABSTRACT

Parallel columns of gas adsorbent beds to evolve an effluent gas enriched in a first component of a feed gas. Each column consists of the serial arrangement of a first bed of molecular sieve material selective to the first component, a plenum and a second bed of molecular sieve material selective of a second component of the feed gas. During one column pressurization the beds of another column are regenerated. More particularly, gas evolved from the second bed of the pressurized column is counterflowed through the second bed of the other column to the plenum of that column where it is subsequently mixed with feed gas and used as feed for the first bed of that column.

9 Claims, 3 Drawing Figures

FIG. 2

| VALVE NO. \ STEP | 1 | 2 | 3 | 4 | 5 | 6 | 7 | 8 | 9 | 10 | 11 | 12 |
|---|---|---|---|---|---|---|---|---|---|---|---|---|
| 26 |  |  | ● | ● | ● | ● |  |  |  |  |  |  |
| 28 |  |  |  |  |  |  |  |  | ● | ● | ● | ● |
| 30 |  |  | ● | ● | ● | ● |  |  | ● | ● | ● | ● |
| 36 |  |  |  |  | ● | ● |  |  |  |  | ● | ● |
| 40 |  |  |  |  |  |  | ● | ● | ● | ● | ● |  |
| 42 | ● | ● | ● | ● | ● |  |  |  |  |  |  |  |
| 46 |  | ● | ● | ● | ● | ● |  | ● |  |  |  |  |
| 48 |  | ● |  |  |  |  |  |  | ● | ● | ● | ● |
| 50 | ● | ● | ● | ● | ● | ● |  |  |  |  |  |  |
| 52 | ● | ● | ● | ● | ● | ● |  |  |  |  |  |  |
| 56 |  |  |  |  |  |  | ● | ● | ● | ● | ● | ● |
| 58 |  |  |  | ● |  |  | ● | ● | ● | ● | ● | ● |
| 60 |  |  |  | ● | ● | ● |  |  | ● | ● | ● |  |
| 62 |  |  |  |  | ● | ● |  |  |  |  |  |  |
| 64 |  |  | ● | ● | ● |  |  |  |  | ● | ● | ● |
| 66 |  |  |  |  |  |  |  |  |  |  |  |  |
| 70 |  |  |  | ● | ● |  |  |  |  | ● | ● |  |
| 74 |  |  |  |  | ● | ● |  |  |  |  |  |  |
| 78 |  |  |  |  |  |  |  |  |  |  | ● | ● |

TIME⟶

● = VALVE OPEN

PROCESS AND COMPOUND BED MEANS FOR EVOLVING A FIRST COMPONENT ENRICHED GAS

FIELD OF THE INVENTION

This invention relates to an adsorption system for evolving a gas stream which is enriched in a desired component by passage of a feed gas through an adsorption bed. It is particularly suited to increasing the proportion of oxygen or nitrogen in air as a feed gas.

BACKGROUND OF THE INVENTION

Molecular sieve materials have been used as adsorbers in adsorption beds through which a feed gas, such as air, is passed and to which various components of the feed gas will adhere depending generally on the type of adsorber and other factors such as gas pressure and temperature. Complete separation of the feed gas constituent gas cannot be achieved in a single pass through the adsorption bed, however, and the adsorbed gas must be periodically purged or removed from the system to regenerate its adsorption capability since the adsorber becomes saturated in that it can only hold a finite, usually small amount of the adsorbed constituent gas. Bed saturation and regeneration occurs in the following manner. Feed gas under pressure is forced through the adsorption from an input end to an output end. Gas exiting the output end is at first enriched in the desired component. However, as the enriched gas continues to evolve from the output end, evidencing that one component gas is being adsorbed in the bed, a line or front, behind which the adsorber is saturated with the absorbed component, advances through the adsorber from the input end toward the output end. When the front reaches the output end the adsorber is saturated and can hold no more of the adsorbed gas and the adsorbed gas "breaks through" the output end. The quality of the evolved gas is thereafter degraded. The bed, however, can be regenerated by interrupting the feed gas flow, venting the bed to a lower pressure and counterflowing a small quantity of enriched gas through the bed from the output end to the input end. Optimally, at least two parallel adsorption beds are used in a system to evolve a gas enriched in a desired component. While one bed is alternately pressurized with feed gas to evolve the desired gas, the other bed is alternately regenerated by counterflowing a small portion of the evolved desired gas through the bed to a vent.

SUMMARY OF THE INVENTION

It should be obvious from the above discussion of the background of the invention that an adsorption bed will saturate slower and evolve a higher purity of desired component if the feed gas is preenriched in the desired component before it is pumped into the inlet port of an adsorption bed. The present invention provides such preenrichment of the feed gas and is embodied as basically parallel compound columns each comprised of a first adsorption bed having an adsorber which is selective of one component or constituent of the feed gas and a second adsorption bed having an adsorber which is selective of another component of the feed gas. A concentrator plenum is interposed between the two beds and piping with the necessary valving provides controlled gas communication between the various elements of the system. As in the prior art the columns operate alternately, that is, while one column operates to evolve the desired enriched gas, the other column is regenerated. More specifically, assuming the desired enriched gas is evolved from the first bed, the gas evolved from the second bed is counterflowed through the second bed of a second column to the plenum of that column. This action not only regenerates the second bed of the second column but also stores enriched gas in the second column plenum that is flushed from the second column second bed. Subsequently, during pressurization of the second column, the feed gas is mixed into the gas of the second column plenum and the thereby somewhat enriched feed gas supplied to the second column first bed.

BRIEF DESCRIPTION OF THE DRAWINGS

FIG. 2 is a flow chart which is helpful in explaining the operation of the system of FIG. 1 and particularly the relative timing of the various valves thereof.

DESCRIPTION OF THE PREFERRED EMBODIMENT

Figure 1:
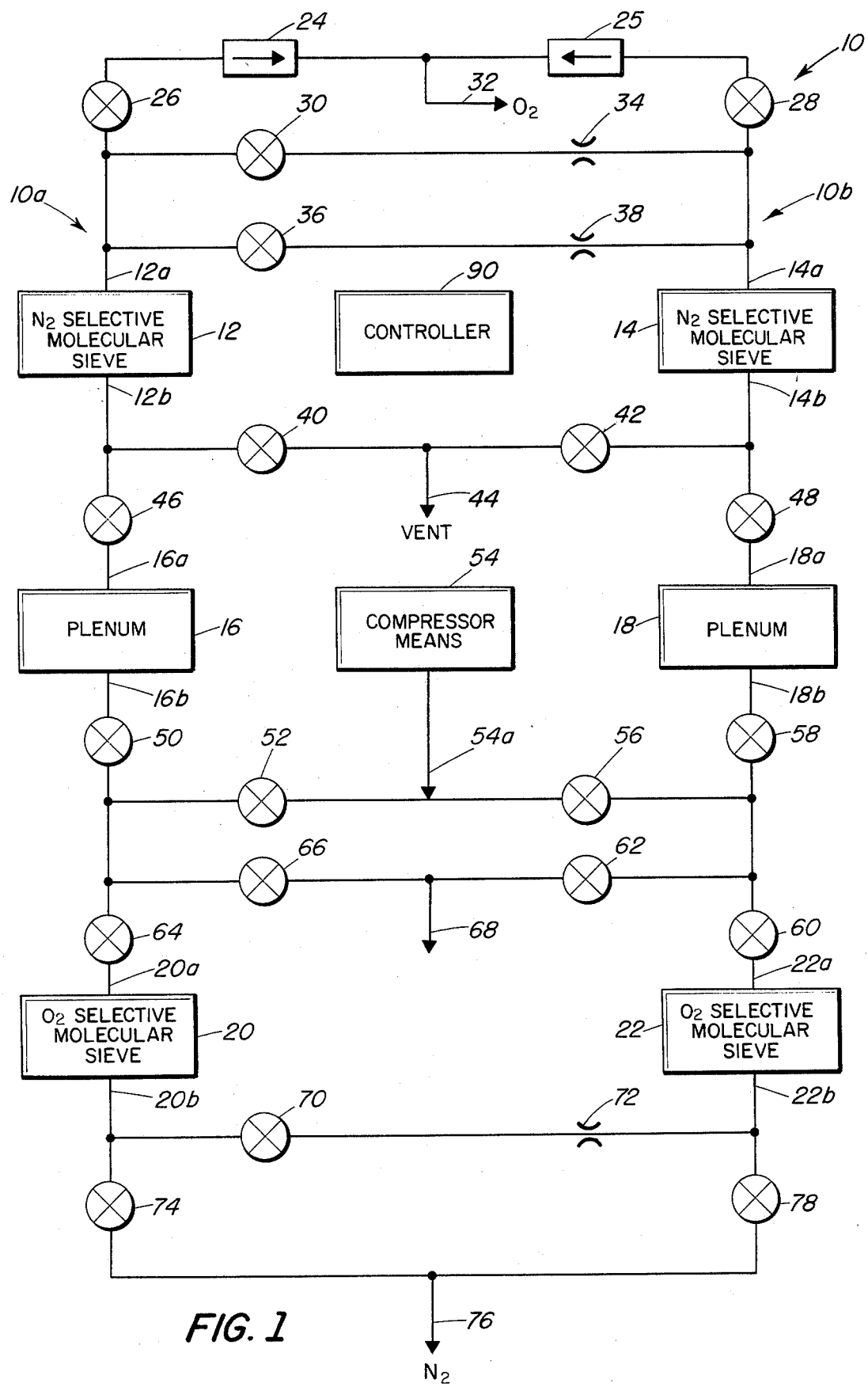
FIG. 1 is a block diagram of a gas enrichment system built according to the present invention.

A compound bed gas enrichment system built in accordance with the present invention is shown at 10 in FIG. 1, reference to which should now be made. Gas concentration system 10 is embodied as an oxygen concentrator wherein compressed atmospheric air is received at input port 54a from compressor 54 and an effluent enriched in oxygen is delivered at outlet port 32. System 10 is comprised of identical parallel branches 10a and 10b consisting respectively of molecular sieve beds 12 and 14, the molecular sieve material here being nitrogen selective such as zeolite 5A, molecular sieve beds 20 and 22, the molecular sieve material here being oxygen selective such as zeolite 4A, and plenum chambers 16 and 18 connected respectively between beds 12 and 20 and beds 14 and 22. In the figures, the lines connecting the various elements designate gas conduits. In addition, the valves pictured, except for check valves 24 and 25, for example valve 26, are in this embodiment, 2-way valves which are controlled in appropriate sequence by a controller 90. The valves are suitably solenoid valves which receive electrical actuation signals from controller 90 but can also be mechanically controlled valves receiving mechanical actuation by controller 90, for example. Thus, valve 26 and check valve 24 are serially connected between the output port 12a of bed 12 and system output port 32. In like manner valve 28 and check valve 25 are serially connected between output port 14a of bed 14 and system output port 32. Serially connected valve 30 and orifice 34 are connected in parallel with serially connected valve 36 and orifice 38 between output ports 12a and 14a. Valve 46 is connected between input port 12b of bed 12 and port 16a of plenum 16 while valve 48 is connected between input port 14b of bed 14 and port 18a of plenum 18. Valves 40 and 42 respectively connect ports 12b and 14b to vent port 44. Vent is a gas sink at a pressure less than the pressure of the gas supplied at system input port 54a. In this embodiment vent is to atmosphere. Valves 50 and 64 are serially connected between port 16b of plenum 16 and input port 20a of bed 20. Valves 58 and 60 are serially connected between port 18b of plenum 18 and input port 22a of bed 22. Valves 52 and 56 respectively connect the common ports of valves 50/64 and valves 58/60 to system input port 54a. Valves 66 and 62 respectively connect ports 20a and 22a to vent 68, which is preferably identical to vent 44. Valves 74 and 78 respectively connect output port 20b of bed 20 and output port 22b of bed 22 to a nitrogen output port 76. As will be explained, the gas exiting the system at port 76 will be enriched in nitrogen. However, one skilled in the art will find the system of FIG. 1 particularly adapted to evolve oxygen gas and will thus normally prefer to adjust the system to do so efficiently. In that case, according to the present state of the art, the nitrogen gas evolved at port 76 will be of low commercial grade and thus not normally useful. Thus, port 76 will exhaust to vent 44/68 which, it will be remembered, in this embodiment is atmosphere.

Gas concentrator system 10 operates in the traditional manner whereby one column, for example column 10a, is pressurized by compressor 54 to evolve an effluent enriched in one component, here oxygen, of the feed gas, while the other column, for example column 10b and its adsorbent beds, are regenerated. The system continues to operate in this mode until column 10a is saturated or close to saturated with the adsorbed component, nitrogen in the case of bed 12 and oxygen in bed 20, as determined by a change in the pressure or other measurable parameter of the column or empirically whereby the system operates on a timed basis. At that time the valves shift to cause column 10b to be pressurized to evolve the desired enriched effluent while column 10a is regenerated. The system continues to alternate between these two modes. Of course, as known in the art, a system might be designed to have three parallel successively pressurized columns.

Briefly, the operation of system 10 is as follows. During a first column, assume column 10a, pressurization mode, column 10b is regenerated. Specifically, pressurized feed gas is supplied from compressor means 54 via valves 52, 50, plenum 16 and valve 46 to adsorbent bed 12 which thereby evolves oxygen enriched product gas via valve 26 and check valve 24 to outlet port 32 for use. At the same time pressurized feed gas is supplied directly through valve 64 to adsorbent bed 20 which thereby evolves a nitrogen enriched gas at port 20b. A portion of the oxygen enriched product gas is counterflowed via the parallel arrangement of valve 30 with orifice 34 and valve 36 and orifice 38 through absorbent bed 14 and valve 42 to vent 44 to thus regenerate bed 14. At least a portion of the nitrogen enriched gas is counterflowed via valve 70 and orifice 72 through adsorbent bed 22 and valves 60 and 58 to plenum 18. This latter action flushes oxygen molecular formerly adsorbed by the material of bed 22 into plenum 18. Some of the evolve nitrogen enriched gas can be dumped from the system via valve 74 to vent port 76 or valve 62 via vent port 68. The latter port is used to ensure that bed 22 is completely regenerated. At the completion of the first column regeneration mode the elements of the first column, here column 10a, are vented. During the second column pressurization mode column 10b is pressurized and column 10a is regenerated in like manner, which should now be clear to one skilled in the art.

The more particular operation of system 10 is as follows, with reference to FIG. 2 where the states of the various valves of FIG. 1 are charted as operation of system 10 proceeds. With compressor 54, which optimally includes a reservoir and a gas pressure regulating means, running to provide a steady supply of pressurized feed gas, at step 1, where it is assumed column 10a has just been regenerated and column 10b is saturated with the adsorbed component, valves 42, 50 and 52 open, the other valves at this time being closed. Bed 14, which immediately prior thereto had been pressurized, is thus vented to vent 44 and a nitrogen enriched exhaust flows therethrough to begin regeneration of bed 14. At the same time gas pressure from compressor 54 begins to build in plenum 16. It will become clear as the description of the operation continues that plenum 16 initially contains an oxygen enriched gas. At step 2 valves 46 and 48 also open. Plenum 18 is thus vented to atmosphere and the pressurized oxygen enriched gas in plenum 16 begins to pressurize bed 12. At step 3 valve 48 closes to isolate plenum 18 again and valves 26, 30 and 64 open. As a result the oxygen enriched effluent flows through check valve 24 to system outlet port 32 where the effluent is utilized in the conventional manner. In addition, a small portion of the evolved enriched effluent passes through valve 30 and orifice 34 to counterflow through bed 14 and valve 42 to vent 44 to thereby continue conventional regeneration of bed 14. Further, bed 20 is pressurized through valve 64 from compressor 54. At step 4 valves 58, 60 and 70 open to begin regeneration of bed 22. More specifically, just prior to step 4, bed 22, which is an adsorbent selective of oxygen, is pressurized and saturated with oxygen. Thus with valves 58 and 60 open the pressure in plenum 18, which it will be remembered is just prior to step 4 at vent pressure, and bed 22 are equalized when the pressurized gas in bed 22, which is now enriched in oxygen, flows into plenum 18. Also, a portion of the nitrogen enriched effluent from bed 20 flows into bed 22, through valve 70, orifice 72 and port 22b to continue regeneration of bed 22, whereby an oxygen enriched gas continues to flow into plenum 18. At step 5 valve 58 closes. This is optimally when the pressure in plenum 18 nears or reaches the pressure of the feed gas from compressor 54. There is thus now stored in plenum 18 a pressurized oxygen enriched feed gas. At the same time valve 62 opens to permit the exhaust from bed 22 to flow to vent 68 to thus continue regeneration of bed 22. In addition valve 74 opens to permit nitrogen enriched effluent from bed 22 to flow to exhaust port 76. Valve 36 also opens to permit additional oxygen enriched effluent to flow therethrough and orifice 38 to counterflow through bed 14 to vent 44, thus to hasten regeneration of that bed. At step 6 valve 42 closes and bed 14 becomes pressurized with oxygen enriched gas via valves 30 and 36. Valves 64 and 70 also close so that bed 22 is now vented through valve 62 and the pressure in bed 20 is allowed to decay to vent pressure. The beginning of step 6 optimally coincides with the complete regeneration of bed 22.

It should be noted at this time that with the correct sizing of beds 20 and 22 the complete regeneration of bed 22 (and bed 20 in the alternate mode) will coincide with the equalizing of pressures in plenum 18 and bed 22 (and plenum 16 and bed 20 in the alternate mode) which occurs during step 4. In that event, valves 62 and 66 and vent 68 are not needed since the venting of bed 22 (and bed 20) can be accompllished through valve 78 (valve 74) at step 6.

At the end of step 6 the first column pressurizing mode of operation, whereby an oxygen enriched effluent is evolved from column 10a, is completed. Column 10a is saturated. More particularly, bed 12 is optimally saturated in nitrogen and bed 20 is saturated in oxygen.

At the same time column 10b is regenerated, or in other words, bed 14 is saturated and pressurized in oxygen, bed 22 is saturated in nitrogen and plenum 18 is pressurized with an oxygen enriched feed gas. Thus, at step 7 system 10, and the valves in particular, switch to the alternate mode. Thus valves 26, 30, 36, 46, 50, 52, 60, 62 and 74 close and valves 40, 56 and 58 open. The operation of system 10 in the alternate and continuing modes should now be obvious to one skilled in the art and need not be described in detail.

Figure 3:
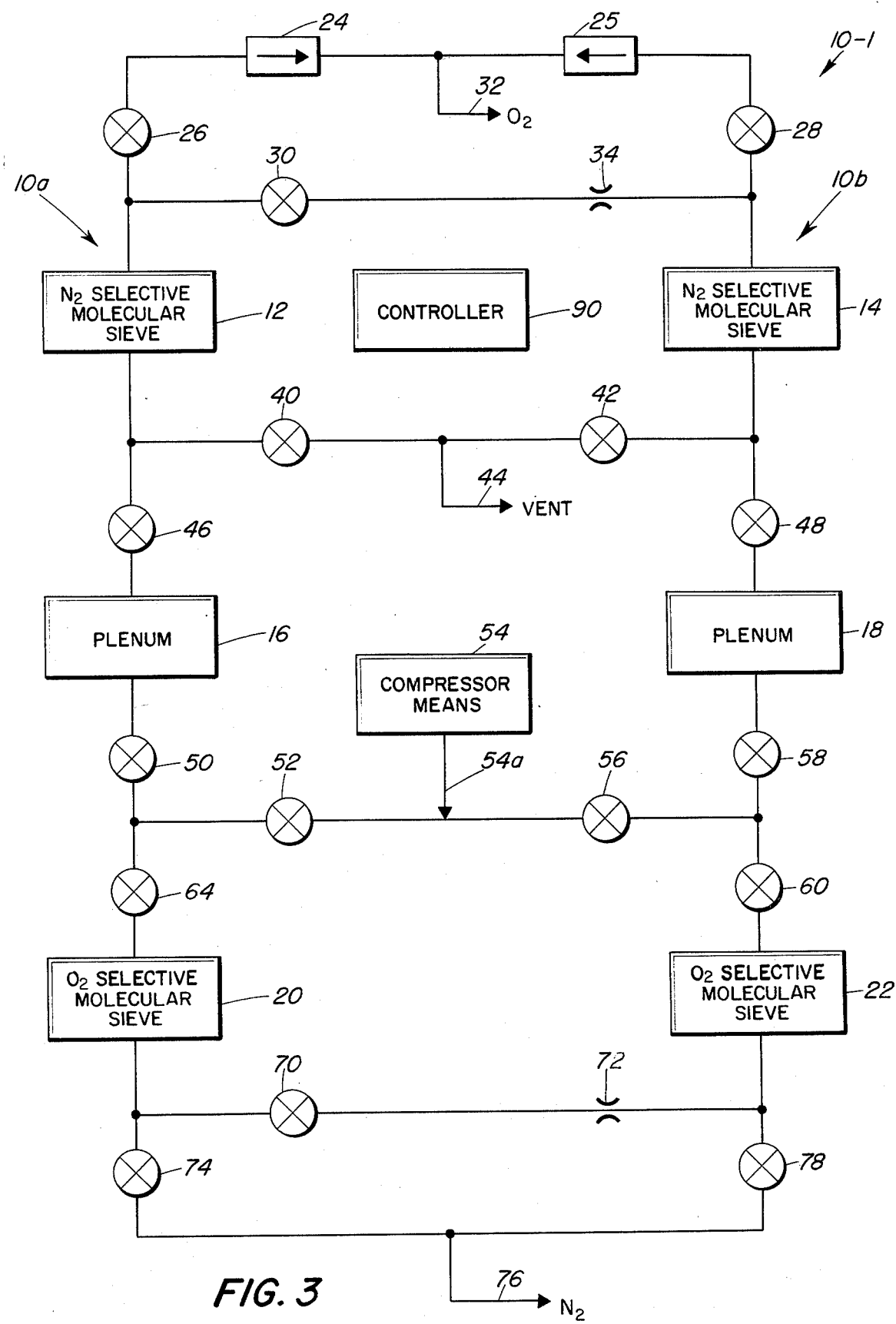
FIG. 3 is a block diagram of a preferred gas enrichment system built according to the present invention.

Reference should now be made to FIG. 3 where a compound bed gas enrichment system 10-1 similar to that of FIG. 1 is shown and where like elements are designated by like numerals. The system of FIG. 3 differs from the system of FIG. 1 in that certain elements are not used. Specifically, valve 36 and orifice 38 of FIG. 1 are not used in the system of FIG. 3 as well as vent 68 and valves 62, 64, 66 and 68. Adsorbent beds 20 and 22 are sized with respect to plenum chambers 16 and 18 respectively, so that during the bed regeneration and consequent charging of the associated plenum chamber with oxygen, the bed is regenerated when the associated plenum chamber is charged. In other words, an adsorbent bed 20 or 22 is sized to be fully regenerated when the pressure in its associated plenum chamber 16 or 18 is about equal to the pressure of the feed gas. Thereafter the bed is vented through valve 74 or 78, as appropriate, discharging nitrogen gas to vent port 76.

The operation of system 10-1 is similar to that of system 10 of FIG. 1 and proceeds as follows. Valves 50 and 52 open to pressurize plenum 16 from compressor means 54 and valve 42 opens to vent previously pressurized adsorbent bed 14 to vent port 44. Valve 46 then opens to pressurize adsorbent bed 12 from plenum 16 and valve 26 opens to evolve oxygen enriched product gas via check valve 24 and outlet port 32. Valve 30 opens to counterflow a portion of the product gas through adsorbent bed 14 to vent port 44 via orifice 34 and valve 42. Valve 64 opens to pressurized adsorbent bed 20 directly from compressor means 54. Subsequently, valves 58, 60 and 70 open to permit the nitrogen enriched effluent from adsorbent bed 20 to counterflow through adsorbent bed 22 to plenum 18 via orifice 72. This action, of course, regenerates adsorbent bed 22 by sweeping previously adsorbed oxygen molecules therefrom and into plenum 18. This continues until the gas pressure in plenum 18 is about equal to the feed gas pressure from compressor means 54. At that time valves 58, 60 and 70 close and valve 74 opens. Nitrogen enriched gas is thus swept out of the system through vent port 76, while the amount of oxygen adsorbed on the material of bed 20 continues to increase. At the time bed 20 is saturated in oxygen, which time can be determined by sensing pressure change in the bed, or empirically, as known to those skilled in the art, valve 64 and then valve 74 are closed. Adsorbent bed 20 is now regenerated and at vent pressure waiting for the alternate mode of operation. Optimally, adsorbent bed 12 becomes saturated with nitrogen at about the same time bed 20 becomes saturated with oxygen. At that time controller 90 shifts the valves to the column 10b pressurization mode whereby column 10b evolves oxygen enriched product gas at outlet port 32 and column 10a is regenerated. The operation of system 10-1 in this and continuing modes should now be obvious with a reading and understanding of the above.

It should additionally be noted that the invention is suitable to produce effluents enriched in other components. For example, by use of oxygen selective molecular sieves for beds 12 and 14 and nitrogen selective molecular sieves for beds 20 and 22 a compound bed gas concentrator system can be designed to evolve nitrogen enriched effluent. Other modifications and alterations of the invention should also now be obvious to one skilled in the art. Accordingly, the invention is to be limited only by the true spirit and scope of the appended claims.

The invention claimed is:
1. A process for evolving a first component enriched gas from a pressurized gaseous feed mixture having at least first and second gaseous components comprising the steps of:
    (a) providing a first column comprised of first and second adsorbent beds and a plenum chamber, said first adsorbent bed being arranged to receive said pressurized gaseous feed mixture somewhat enriched in said first component from said plenum chamber and evolve said first component enriched gas during a first column pressurizing mode, said second adsorbent bed being arranged to receive said prearranged gaseous feed mixture directly and evolve a second component enriched gas during said first column pressurizing mode;
    (b) providing at least a second column essentially identical to said first column;
    (c) counterflowing a portion of the first component enriched gas evolved from said first column through the first adsorbent bed of the second column to a low pressure vent;
    (d) counterflowing at least a portion of the second component enriched gas evolved from said first column through the second adsorbent bed of the second column to the plenum chamber of said second column to thereby charge the plenum chamber of said second column with a gas enriched in said first component;
    (e) communicating the second adsorbent bed of the first column to said low pressure vent; and,
    (f) during a second column pressurizing mode delivering said pressurized gaseous feed mixture to the first adsorbent bed of the second column through the plenum of the second column to evolve said first component enriched gas and directly to the second bed of the second column to evolve said second component enriched gas.

2. The process for evolving a first component enriched gas of claim 1 with the additional steps of:
    (g) counterflowing a portion of the first component enriched gas evolved from said second column through the first adsorbent bed of the first column to a low pressure vent;
    (h) counterflowing at least a portion of the second component enriched gas evolved from said second column through the second adsorbent bed of the first column to the plenum chamber of said first column to thereby charge the plenum chamber of said first column with a gas enriched in said first component; and,
    (i) communicating the second adsorbent bed of the first column to said low pressure vent.

3. The process for evolving a first component enriched gas of claims 1 or 2 wherein said low pressure vent is at environmental atmospheric pressure.

4. The process for evolving a first component enriched gas of claims 1 or 2 wherein said pressurized gaseous feed mixture is air.

5. A compound bed means for evolving a first component enriched gas from a pressurized gaseous feed mixture having at least a first and second gaseous component comprising:
- a first column periodically receiving said pressurized gaseous feed mixture and comprised of first and second adsorbent beds and a plenum chamber, said first adsorbent bed being arranged to receive said pressurized gaseous feed mixture from said plenum chamber and evolve said first component enriched gas, said second adsorbent bed being arranged to receive said pressurized gaseous feed mixture directly to evolve a second component enriched gas;
- at least a second column essentially identical to said first column periodically receiving said pressurized gaseous feed mixture;
- a vent; and
- valving means for supplying said pressurized gaseous feed mixture to said first column; a portion of the first component enriched gas from said first column to counterflow through the first adsorbent bed of the second column to said vent and at least a portion of the second component enriched gas from said first column to counterflow through the second adsorbent bed of the second column to the plenum of the second column during a first column pressurizing mode, and for supplying said pressurized gaseous feed to said second column during a second column pressurizing mode.

6. The compound bed means for evolving a first component enriched gas of claim 5 wherein said valving means additionally comprises means for supplying a portion of the first component enriched gas from said second column to counterflow through the first adsorbent bed of the first column to said vent and at least a portion of the second component enriched gas from said second column to counterflow through the second adsorbent bed of the first column to the plenum of the first column.

7. The compound bed means for evolving a first component enriched gas of claim 6 including means for cycling said valving alternately to said first column pressurizing mode and said second column pressurizing mode.

8. The compound bed means for evolving a first component enriched gas of claims 5, 6 or 7 wherein said vent is at environmental atmospheric pressure.

9. The compound bed means for evolving a first component enriched gas of claims 5, 6 or 7 wherein said pressurized gaseous feed mixture is air.

* * * * *